US010411785B2

(12) United States Patent
Davydov et al.

(10) Patent No.: US 10,411,785 B2
(45) Date of Patent: Sep. 10, 2019

(54) RECEIVE BEAM INDICATION FOR 5G SYSTEMS

(71) Applicant: Intel Corporation, Santa Clara, CA (US)

(72) Inventors: Alexei Davydov, Nizhny Novgorod (RU); Hyejung Jung, Palatine, IL (US); Gregory Morozov, Nizhny Novgorod (RU)

(73) Assignee: INTEL CORPORATION, Santa, CA (US)

( * ) Notice: Subject to any disclaimer, the term of this patent is extended or adjusted under 35 U.S.C. 154(b) by 0 days.

(21) Appl. No.: 15/747,397

(22) PCT Filed: Dec. 26, 2015

(86) PCT No.: PCT/US2015/000371
§ 371 (c)(1),
(2) Date: Jan. 24, 2018

(87) PCT Pub. No.: WO2017/023231
PCT Pub. Date: Feb. 9, 2017

(65) Prior Publication Data
US 2018/0219605 A1 Aug. 2, 2018

Related U.S. Application Data

(60) Provisional application No. 62/199,512, filed on Jul. 31, 2015.

(51) Int. Cl.
*H04B 7/08* (2006.01)
*H04B 7/024* (2017.01)

(52) U.S. Cl.
CPC ............. *H04B 7/088* (2013.01); *H04B 7/024* (2013.01); *H04B 7/0862* (2013.01)

(58) Field of Classification Search
CPC ....... H04B 7/088; H04B 7/024; H04B 7/0862
See application file for complete search history.

(56) References Cited

U.S. PATENT DOCUMENTS

2011/0317748 A1   12/2011   Li et al.
2012/0002681 A1    1/2012   Inohiza et al.
(Continued)

OTHER PUBLICATIONS

3GPP TS 36.213; "$3^{rd}$ Generation Partnership Project; Technical Specification Group Radio Access Network; Evolved Universal Terrestrial Radio Access (E-UTRA); Physical layer procedures"; (Dec. 2014); 225 pages; V. 12.4.0 (Release 12).
(Continued)

*Primary Examiner* — Sophia Vlahos
(74) *Attorney, Agent, or Firm* — Thorpe North & Western

(57) ABSTRACT

Systems and technologies described herein provide functionality for a cellular base station to dynamically indicate a reception (Rx) beam to be used by a user equipment (UE). The Rx beam can be indicated explicitly or implicitly. The UE can, for example, use the Rx beam for Physical Downlink Shared Channel (PDSCH) reception, Channel State Information Reference Signal (CSI-RS) measurements, and/or Channel State Information (CSI) calculation at the UE. Systems and technologies described herein are generally useful for systems that use multiple transmission (Tx) beams and/or that support Coordinated Multipoint (CoMP) transmission technology.

18 Claims, 11 Drawing Sheets

(56) References Cited

U.S. PATENT DOCUMENTS

| | | | |
|---|---|---|---|
| 2012/0087332 A1* | 4/2012 | Kim .................. | H04B 7/063 370/329 |
| 2013/0188558 A1 | 7/2013 | Nam et al. | |
| 2013/0223251 A1 | 8/2013 | Li et al. | |
| 2013/0231058 A1* | 9/2013 | Ramachandran .... | H04B 7/0695 455/63.4 |
| 2013/0272220 A1* | 10/2013 | Li .................. | H04W 72/046 370/329 |
| 2014/0011543 A1* | 1/2014 | Li .................. | H04W 52/0206 455/561 |
| 2014/0050127 A1* | 2/2014 | Wang .................. | H04W 4/70 370/280 |
| 2015/0319776 A1* | 11/2015 | Seo .................. | H04W 74/002 370/329 |
| 2015/0358061 A1* | 12/2015 | Zhang .................. | H04B 7/0456 370/329 |
| 2017/0012692 A1* | 1/2017 | Kim .................. | H04B 7/0695 |

OTHER PUBLICATIONS

Alcatel-Lucent Shanghai Bell et al.; "DCI Format Design for LTE-A PUSCH Transmission"; 3GPP TSG R1-100938; (Feb. 22-26, 2010); 7 pages; RAN WG1 Meeting #60, San Francisco, CA; Agenda 7.3.4.
Nokia et al.; "On the reuse of ePDCCH resources"; 3GPP TSG R1-122607; (May 21-25, 2012); 5 pages; RAN WG1 Meeting #68bis, Prague, Czech Republic; Agenda 7.6.5.
International Search Report dated Sep. 3, 2016, in International Application No. PCT/US2015/000371, filed Dec. 26, 2015; 4 pages.

* cited by examiner

200

| Value of 'PDSCH RE Mapping and Quasi-Co-Location Indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

RECEIVE BEAM INDICATION FOR 5G SYSTEMS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node in an Evolved Universal Terrestrial Radio Access Network (E-UTRAN) system is referred to as an eNode B (also commonly denoted as evolved Node Bs, enhanced Node Bs, eNodeBs, or eNBs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

Dynamic point selection (DPS) Coordinated multipoint (CoMP) systems have been developed in order to improve various operational parameters in wireless networks. In DPS CoMP, a transmission point (TP) may be dynamically selected from among several different nodes. Other types of CoMP, such as joint transmission (JT) and cooperative scheduling/cooperative beamforming (CS/CB) can also be used.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
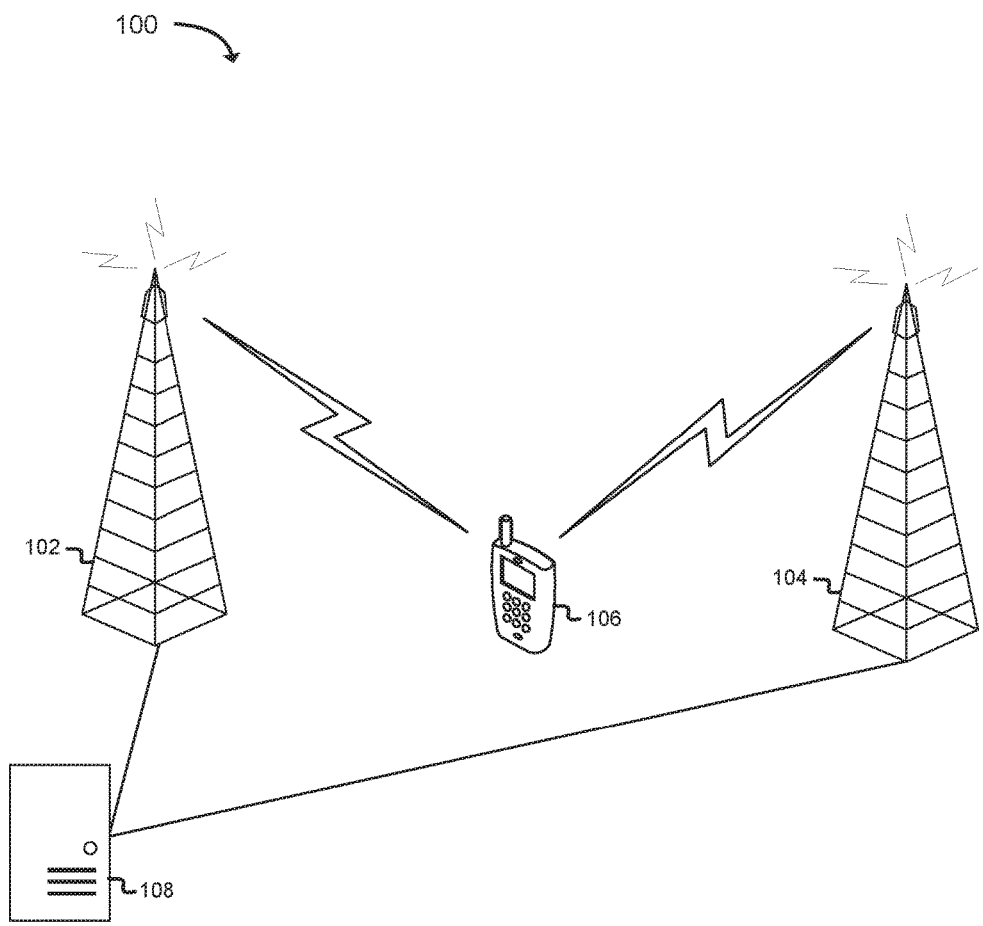
FIG. 1 illustrates a network diagram that provides an example of a setting in which DPS CoMP can be used in accordance with an example.

Reference will now be made to the exemplary embodiments illustrated and specific language will be used herein to describe the same. It will nevertheless be understood that no limitation of the scope of is thereby intended.

DETAILED DESCRIPTION

Before some embodiments are disclosed and described, it is to be understood that the claimed subject matter is not limited to the particular structures, process operations, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating operations and do not necessarily indicate a particular order or sequence.

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

Downlink Coordinated Multipoint (DL CoMP) can be used to improve throughput performance for a user equipment (UE) located at a cell edge. The throughput improvement in DL CoMP can be achieved by coordinating which of a plurality neighboring of neighboring transmission points will transmit certain DL information to the UE at a given time (e.g., by using dynamic point selection (DPS) CoMP).

FIG. 1 illustrates a network diagram 100 that provides an example of a setting in which DPS CoMP can be used so that a transmission point (TP) can be dynamically selected for a user equipment (UE) 106 based on instantaneous channel/interference conditions and based on cell traffic loads. The UE 106 can receive downlink (DL) control data from a serving cellular base station 102. In addition, the UE 106 can also receive a Physical Downlink Shared Channel (PDSCH) transmission from either the serving cellular base station 102 or a second non-serving cellular base station 104. Though cellular base stations 102 and 104 are shown in FIG. 1, other types of TPs may also be used in other examples.

Quasi co-location and PDSCH Resource Element (RE) mapping signaling can be used to indicate a set of reference signals (antenna ports) for time and frequency synchronization with a TP (e.g., cellular base station 102 or cellular base station 104). The quasi co-location and PDSCH RE mapping signaling can also be used to indicate REs on which the PDSCH will be transmitted from the TP (e.g., cellular base station 102 or cellular base station 104).

Up to four PDSCH RE mapping and quasi co-location sets can be configured for the UE using higher-layer signaling. One of the four PDSCH RE mapping and quasi co-location sets can be indicated in Downlink Control Information (DCI) using a '2-bit PDSCH RE mapping and quasi-co-location' field.

Figure 2:
FIG. 2 illustrates an example table of two-bit values and indices of their corresponding parameter sets in accordance with an example.

FIG. 2 illustrates an example table of two-bit values and indices of their corresponding parameter sets (e.g., PDSCH RE mapping and quasi co-location sets). As shown in FIG. 2, a two-bit value of 00 can indicate that a first parameter set should be used by the UE, while a two-bit value of 01 can indicate that a second parameter set should be used, a two-bit value of 10 can indicate that a third parameter set should be used, and a two-bit value of 11 can indicate that a fourth parameter set should be used.

A PDSCH RE mapping and quasi co-location set can include a number of parameters that determine PDSCH RE mapping and PDSCH antenna port quasi-co-location, such as: 'number of Common Reference Signal (CRS) antenna ports for 'Number of CRS antenna ports for PDSCH RE mapping,' 'Multicast-Broadcast Single-Frequency Network (MBSFN) subframe configuration for PDSCH RE mapping,' 'Zero-power Channel State Information Reference Signal (CSI-RS) resource configuration for PDSCH RE mapping,' 'PDSCH starting position for PDSCH RE mapping,' and 'CSI-RS resource configuration identity for quasi co-location.'

In conventional systems, after the DCI is received using physical-layer signaling (e.g., a Physical Downlink Control Channel (PDCCH) or and enhanced PDCCH), receiver antenna weights are dynamically adapted (after analog-to-digital conversion) on a Physical Resource Block (PRB) basis using UE-specific reference signals that are transmitted with the same precoding as the PDSCH.

In fifth generation (5G) systems, it is anticipated that UEs will be equipped with a larger number of antenna elements that UEs that are used with existing LTE Advanced (LTE-A) systems. In principle, each antenna element may be connected to one transceiver unit (TXRU) as in existing LTE-A systems, wherein a TXRU typically comprises a Radio Frequency (RF) unit and an Analog-to-Digital Converter (ADC). However, in order to reduce implementation complexity, several antenna elements can be connected to a single TXRU. A TXRU can be connected to one or more antenna elements using phase shifters (and potentially attenuators) to allow adaptive control of antenna beamforming in the RF domain (i.e., before analog-to-digital conversion).

Figure 3:
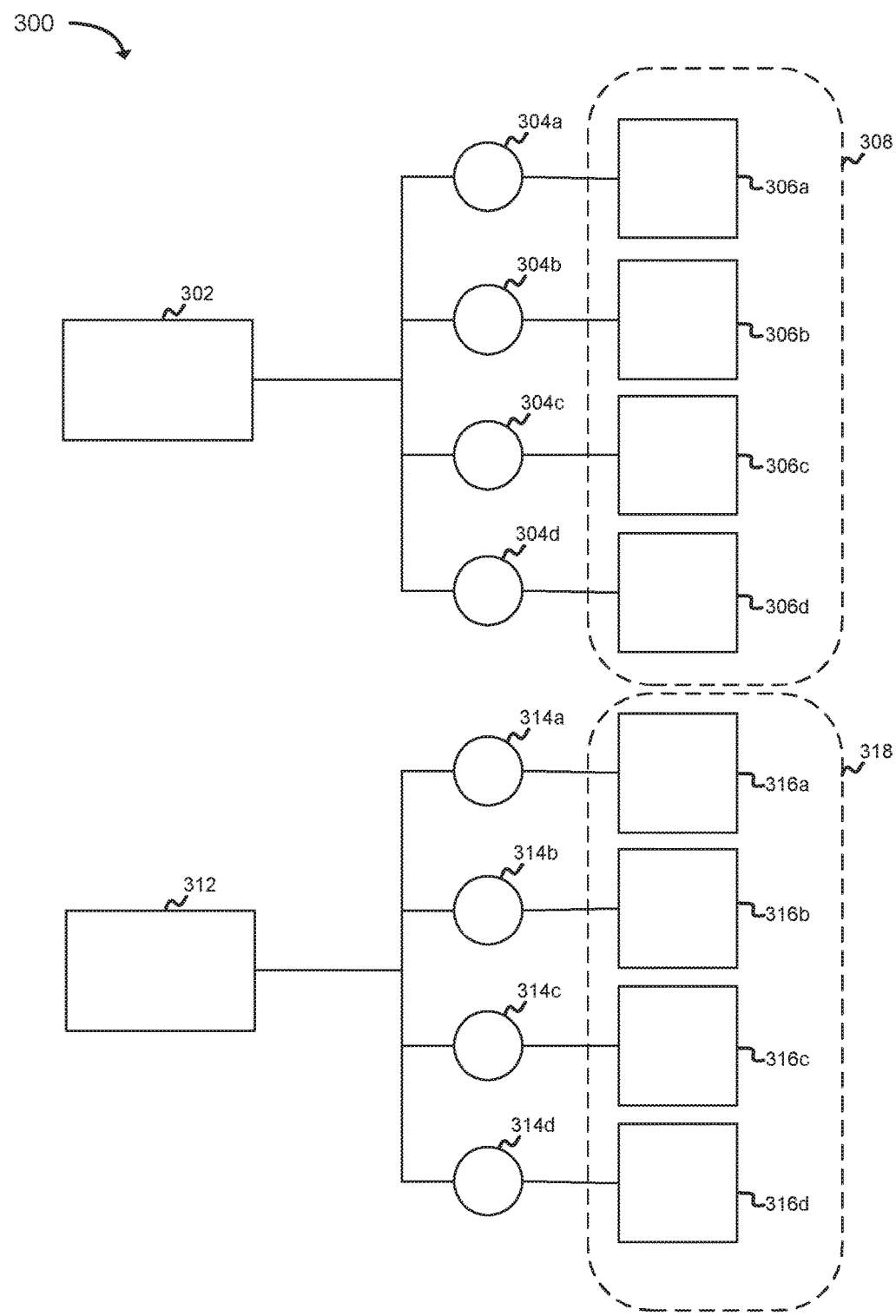
FIG. 3 illustrates an example of a TXRU-to-antenna connection model.

FIG. 3 illustrates an example of a TXRU-to-antenna connection model 300. A TXRU 302 can be associated with an index m'=1 and a TXRU 304 can be associated with an index m'=2. Complex weights 304a-d can be used to rotate the phase of a signal or control the amplitude of signals received from antenna elements 306a-d, respectively. A subarray 308 can comprise the antenna elements 306a-d. Similarly, complex weights 314a-d can be used to rotate the phase of a signal or control the amplitude of signals received from antenna elements 316a-d, respectively. A subarray 318 can comprise the antenna elements 316a-d. In some examples, it is possible to combine signals of the subarrays 308 and 318.

While Reception (Rx) beam selection can be implemented in a reasonably transparent way without CoMP, support of Rx beam selection becomes more difficult when more advanced transmission schemes are used at a cellular base station. In DPS CoMP systems, for example, the different Rx beams may be optimal for different TPs. Hence, it would be helpful for a DPS CoMP system to support proper indication of a TP in order to facilitate selection of an optimal Rx beam. Furthermore, a cellular base station can use more than one transmission (Tx) beam and different Rx beams might provide better results with each possible Tx beam. In such cases, it would be helpful for a DPS CoMP system to support indication of an Rx beam that should be used at a reception point.

Systems and technologies of the present disclosure provide functionality for a cellular base station to indicate an Rx beam dynamically to be used for PDSCH reception and for CSI-RS measurements and Channel State Information (CSI) calculation at the UE for 5G systems that use multiple Tx beams or that support CoMP. In accordance with one example of the technology of the present disclosure, an Rx beam can be explicitly indicated by a cellular base station (e.g., an eNB) in Downlink Control Information (DCI) transmitted in an enhanced Physical Downlink Control Channel (ePDCCH). Alternatively, in accordance with another example, an Rx beam can be implicitly indicated by the transmission of a set of ePDCCH parameters (e.g., an ePDCCH set) whose values are associated with the Rx beam.

In accordance with one example of the technology of the present disclosure, an Rx beam can be explicitly indicated by a cellular base station (e.g., an eNB) in Downlink Control Information (DCI) transmitted in an enhanced Physical Downlink Control Channel (ePDCCH). For example, a PDSCH RE mapping and Quasi Co-Location (QCL) set can include the following parameters: 'Number of CRS antenna ports for PDSCH RE mapping,' 'CRS frequency shift for PDSCH RE mapping,' 'MBSFN subframe configuration for PDSCH RE mapping,' 'zero-power CSI-RS resource configuration for PDSCH RE mapping,' 'PDSCH starting position for PDSCH RE mapping,' and 'CSI-RS resource configuration identity for quasi co-location.' A PDSCH RE mapping and QCL set can also include an additional parameter (e.g., called 'Rx beam index') for PDSCH reception.

Higher-layer Radio Resource Control (RRC) signaling can be used to notify a UE that Rx beams are associated with a particular PDSCH RE mapping and to indicate a PDSCH antenna port QCL and an Rx beam set. The actual PDSCH RE mapping, PDSCH antenna port QCL, and Rx beam among multiple configured sets may be indicated using DCI signaling. Alternatively, a higher-layer configured set may only include the 'Rx beam index' parameter for PDSCH reception and does not have to include other parameters such as 'PDSCH RE mapping' and 'PDSCH antenna port QCL.'

In another example, an Rx beam can be implicitly indicated by the transmission of a set of ePDCCH parameters (e.g., an ePDCCH set) whose values are associated with the Rx beam. More specifically, for each configured ePDCCH set that the UE is supposed to monitor, a corresponding Rx beam index may be configured. In other words, each configured ePDCCH set can be associated with a specific Rx beam index (and therefore with the Rx beam corresponding to the Rx beam index). After a UE detects a DCI transmission on the corresponding ePDCCH set, the UE can use the associated Rx beam for reception of the PDSCH. In other examples other parameters of the E-PDCCH may be used (e.g. search space, Demodulation Reference Signal (DM-RS) antenna ports for ePDCCH, etc.).

To allow time for tuning of the analog Rx beamforming weights at the UE, the UE can receive the PDSCH in Orthogonal Frequency Division Multiplexing (OFDM) symbols that following OFDM symbols used for transmission of the ePDCCH with the Rx beam indication. An additional time gap can be inserted between the ePDCCH transmitting the Rx beam index and the PDSCH to provide sufficient time for the UE to perform the appropriate receiver tuning.

Figure 4:
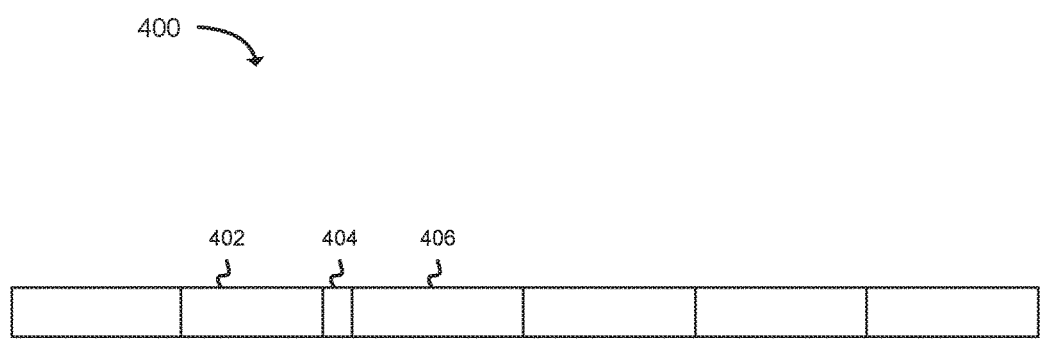
FIG. 4 illustrates how a time gap can be included in OFDM symbols 400 that are used to transmit a ePDCCH and a PDSCH in accordance with an example.

FIG. 4 illustrates an example of how a time gap can be included in OFDM symbols 400 that are used to transmit a ePDCCH and a PDSCH. An OFDM symbol 402 can be transmitted omni-directionally by a cellular base station. The OFDM symbol 402 can include an Rx beam indication in a ePDCCH. A time gap 404 can be included to allow a receiving UE to perform receiver tuning. An OFDM symbol 406 can then be directionally transmitted from the cellular base station to the UE. The UE, in turn, can directionally receive a PDSCH in the OFDM symbol 406 using an Rx beam identified by the Rx beam indication.

In other examples of the present disclosure, a higher-layer CSI-RS configuration can indicate an Rx beam that a UE should use to perform CSI measurements. Alternatively, the Rx beam can also be indicated in a configuration of a CSI process that is used to calculate feedback in CoMP systems.

Alternatively, an Rx beam index can be included in the DCI to indicate that the corresponding Rx beam should be used by the UE for CSI-RS measurements and CSI feedback calculation. For example a DCI format 0 or 4 that triggers aperiodic CSI feedback can also include an additional field that is used to indicate the Rx beam that should be used for CSI-RS measurements and CSI feedback calculation. When this approach is used, the CSI-RS transmission should occur after the transmission of the corresponding triggering DCI.

Figure 5:
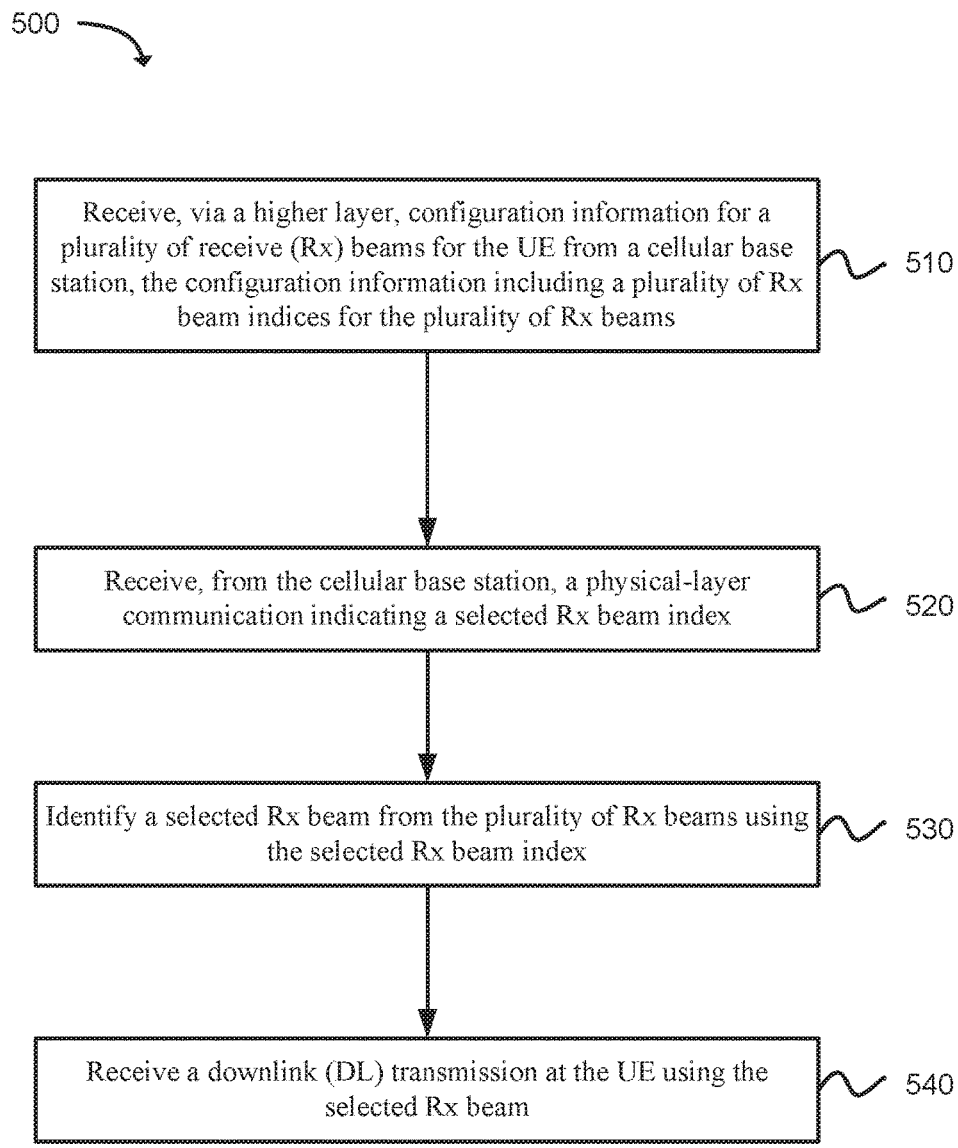
FIG. 5 illustrates functionality of a UE in accordance with an example.

FIG. 5 illustrates functionality 500 of a UE in accordance with an example. The functionality 500 can be implemented as a method or the functionality can be executed as instructions on a machine (e.g., by one or more processors), where the instructions are included on at least one non-transitory computer-readable storage medium.

As in block 510, circuitry at the UE (e.g., comprising one or more processors and memory) can be configured to receive, via a higher layer, configuration information for a plurality of receive (Rx) beams for the UE from a cellular base station, the configuration information including a plurality of Rx beam indices for the plurality of Rx beams. At least one Rx beam index in the plurality of Rx beam indices can be associated with a substantially omni-directional Rx beam, and wherein the plurality of Rx beams includes the substantially omni-directional Rx beam.

The circuitry of the UE can be further configured to receive the configuration information via radio-resource-control (RRC) signaling and wherein the selected Rx beam index is included in a configured parameter set.

As in block 520, the circuitry of the UE can be further configured to receive, from the cellular base station, a physical-layer communication indicating a selected Rx beam index. The physical layer communication can comprise a downlink control indicator (DCI) received in an enhanced physical downlink control channel (ePDCCH) and the selected Rx beam index is explicitly included in the DCI and the circuitry of the UE can be further configured to commence performing channel state information (CSI) measurement using the selected Rx beam based on the explicit inclusion of the selected Rx beam index in the DCI.

As in block 530, the circuitry of the UE can be further configured to identify a selected Rx beam from the plurality of Rx beams using the selected Rx beam index.

The circuitry of the UE can be further configured to commence performing demodulation of a physical downlink shared channel (PDSCH) using the selected Rx beam, wherein the selected Rx beam is implicitly indicated to the UE in the higher-layer configured EPDCCH set, and wherein the higher-layer configured EPDCCH set includes PDSCH scheduling information.

The circuitry of the UE can be further configured to commence performing measurement of the channel state information (CSI) using the selected Rx beam, wherein the selected Rx beam is implicitly indicated to the UE in the higher-layer configured ePDCCH set.

The physical-layer communication can: include a higher-layer configured enhanced physical downlink control channel (ePDCCH) set that is associated with the selected Rx beam, wherein the higher-layer configured ePDCCH set includes parameters for an ePDCCH; and implicitly indicate the selected Rx beam using scheduling information in the higher-layer configured ePDCCH set.10. The higher-layer configured ePDCCH set can comprises a scrambling identity of demodulation reference signals and occupied physical resource blocks.

As in block 540, the circuitry of the UE can be further configured to receive a downlink (DL) transmission at the UE using the selected Rx beam.

The circuitry of the UE can be further configured to receive the DL transmission in a physical downlink shared channel (PDSCH) and to tune analog Rx beamforming weights during a designated tuning time interval between orthogonal-frequency-division-multiplexing (OFDM) symbols of an enhanced physical downlink control channel (ePDCCH) and OFDM symbols of the PDSCH.

The circuitry of the UE can be further configured to receive a channel state information reference signal (CSI-RS) from the cellular base station using the selected Rx beam.

The circuitry of the UE can also be configured to perform channel state information (CSI) measurements using the selected Rx beam.

Figure 6:
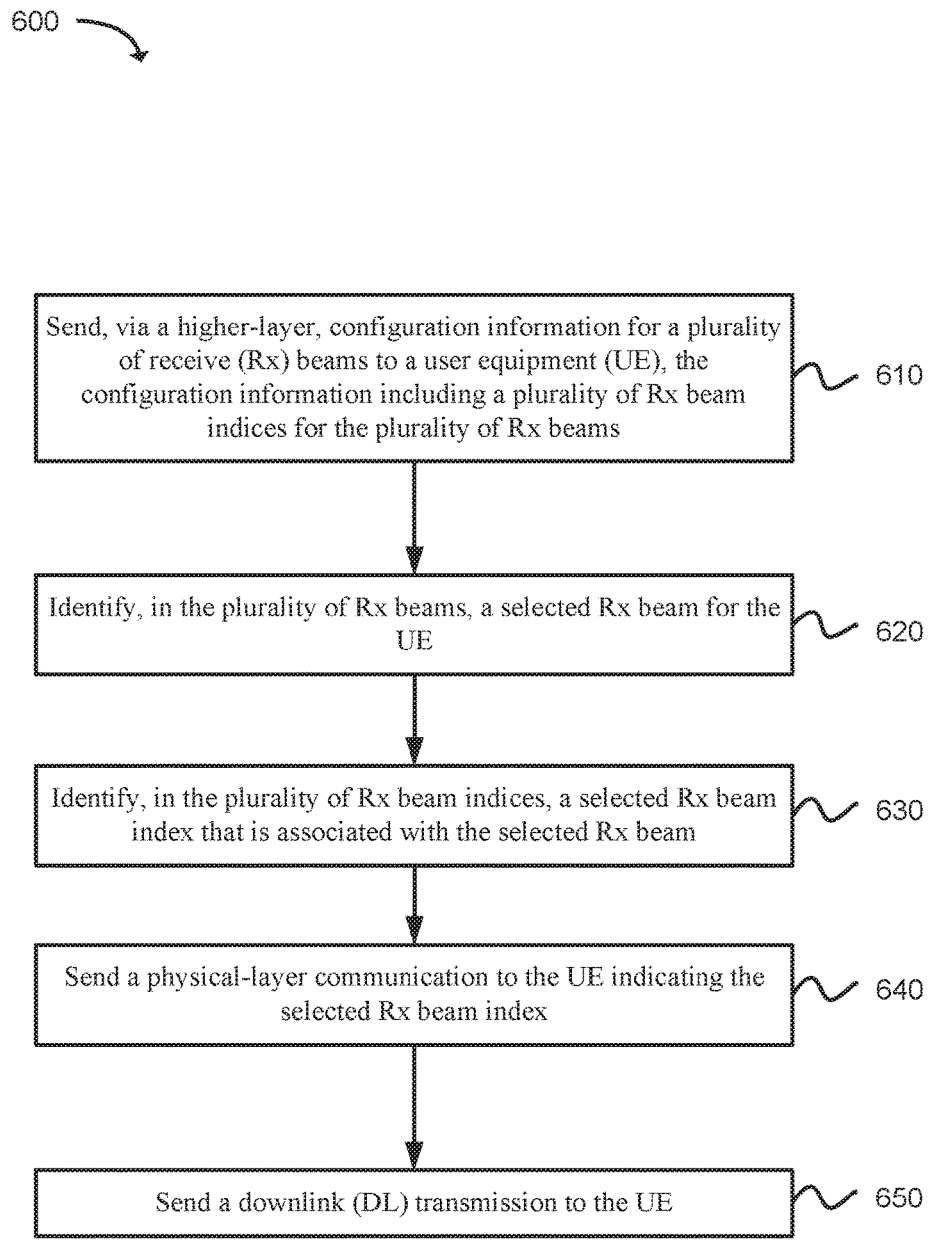
FIG. 6 illustrates functionality of cellular base station in accordance with an example.

FIG. 6 illustrates functionality 600 of cellular base station in accordance with an example. The functionality 600 can be implemented as a method or the functionality can be executed as instructions on a machine (e.g., by one or more processors), where the instructions are included on at least one non-transitory computer-readable storage medium.

As in block 610, circuitry at the cellular base station (e.g., comprising one or more processors and memory) can be configured to send, via a higher-layer, configuration information for a plurality of receive (Rx) beams to a user equipment (UE), the configuration information including a plurality of Rx beam indices for the plurality of Rx beams. At least one Rx beam index in the plurality of Rx beam indices can be associated with a substantially omni-directional Rx beam, and wherein the plurality of Rx beams includes the substantially omni-directional Rx beam.

The circuitry at the cellular base station can be further configured to send the configuration information via radio-resource-control (RRC) signaling and the selected Rx beam index can be included in a configured parameter set.

As in block 620, the circuitry of the cellular base station can be further configured to identify, in the plurality of Rx beams, a selected Rx beam for the UE.

As in block 630, the circuitry of the cellular base station can be further configured to identify, in the plurality of Rx beam indices, a selected Rx beam index that is associated with the selected Rx beam.

The physical-layer communication can comprise a downlink control indicator (DCI) in an enhanced physical downlink control channel (ePDCCH) and the selected Rx beam index is explicitly included in the DCI. The physical-layer communication can also include a higher-layer configured enhanced physical downlink control channel (ePDCCH) set that is associated with the selected Rx beam, wherein the higher-layer configured ePDCCH set includes parameters for an ePDCCH; and implicitly indicate the selected Rx beam using scheduling information in the higher-layer configured ePDCCH set.

As in block 640, the circuitry of the cellular base station can be further configured to send a physical-layer communication to the UE indicating the selected Rx beam index.

As in block 650, the circuitry of the cellular base station can be further configured to send a downlink (DL) transmission to the UE. Specifically, the circuitry of the cellular base station can be configured to send the DL transmission in a physical downlink shared channel (PDSCH).

Figure 7:
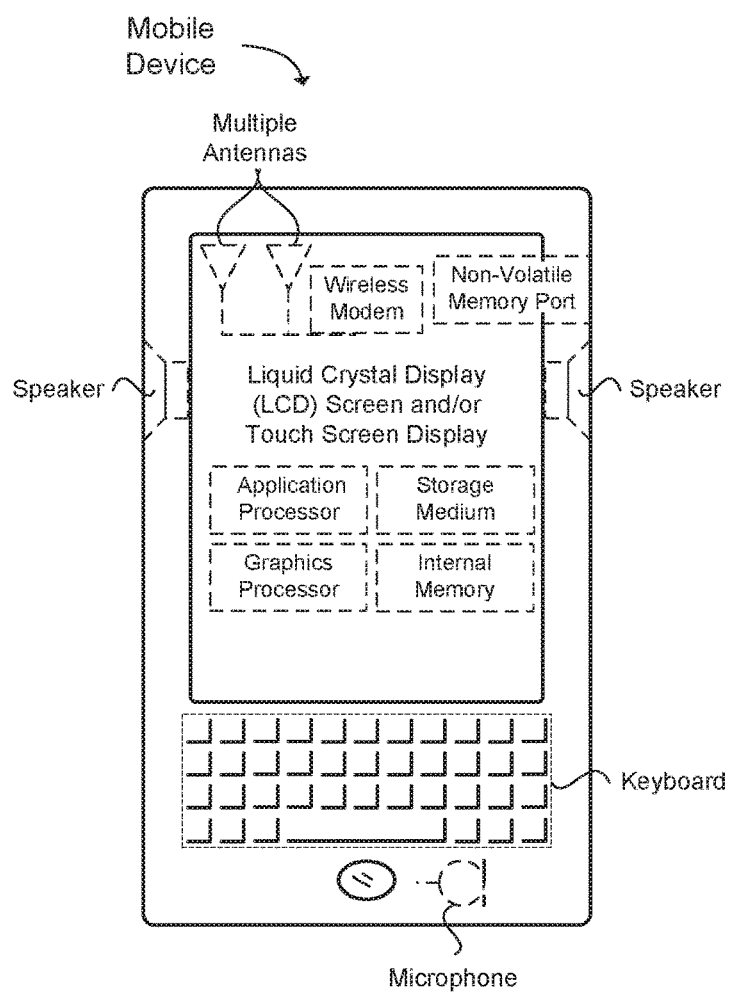
FIG. 7 provides an example illustration of a wireless device in accordance with an example.

FIG. 7 provides an example illustration of a mobile device, such as a user equipment (UE), a mobile station (MS), a mobile wireless device, a mobile communication device, a tablet, a handset, or other type of wireless device. The mobile device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard such as, but not limited to, 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

The mobile device can also comprise a wireless modem. The wireless modem can comprise, for example, a wireless radio transceiver and baseband circuitry (e.g., a baseband processor). The wireless modem can, in one example, modulate signals that the mobile device transmits via the one or more antennas and demodulate signals that the mobile device receives via the one or more antennas.

The mobile device can include a storage medium. In one aspect, the storage medium can be associated with and/or communication with the application processor, the graphics processor, the display, the non-volatile memory port, and/or internal memory. In one aspect, the application processor and graphics processor are storage mediums.

FIG. 7 also provides an illustration of a microphone and one or more speakers that can be used for audio input and output from the mobile device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the wireless device to provide additional user input. A virtual keyboard can also be provided using the touch screen.

Figure 8:
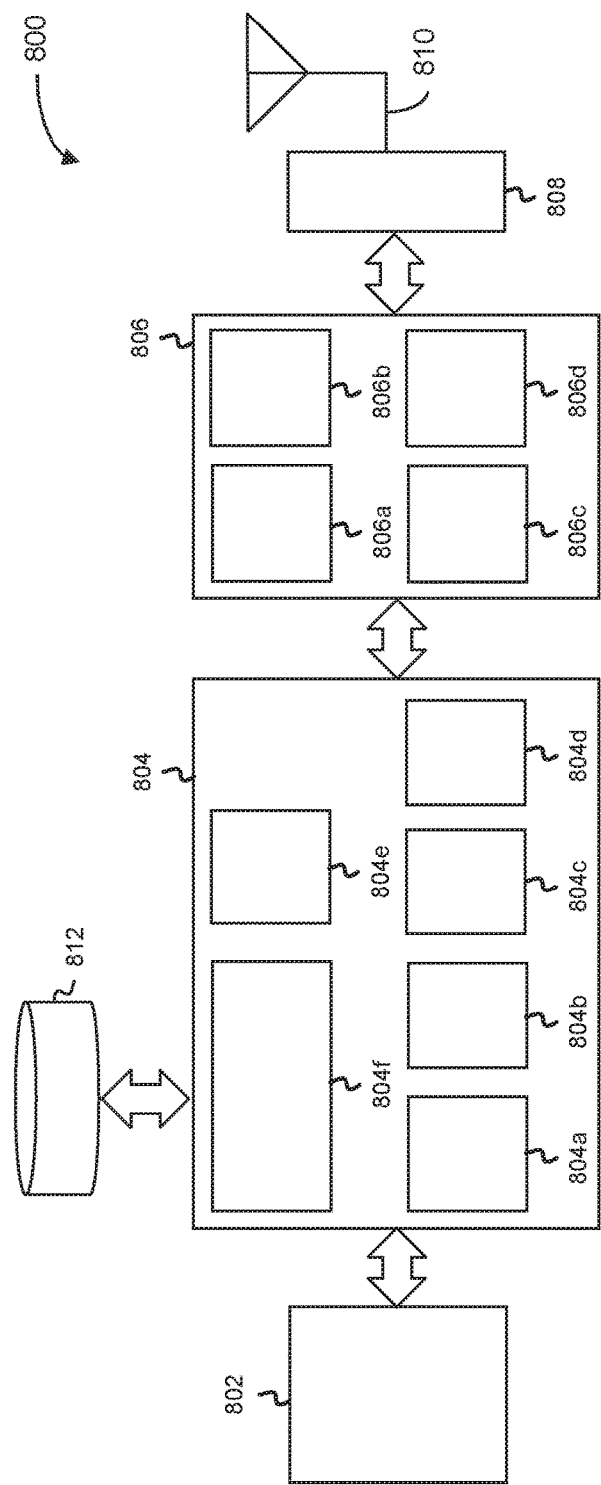
FIG. 8 provides an example illustration of a user equipment (UE) device, such as a wireless device, a mobile station (MS), a mobile wireless device, a mobile communication device, a tablet, a handset, or other type of wireless device.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 800 can be configured to communicate using at least one wireless communication standard such as, but not limited to, 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage (e.g., storage medium 812) and may be configured to execute instructions stored in the memory/storage (e.g., storage medium 812) to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804*a*, third generation (3G) baseband processor 804*b*, fourth generation (4G) baseband processor 804*c*, and/or other baseband processor(s) 804*d* for other existing generations, generations in development or to be developed in the future (e.g., fifth generation (5G), 6G, etc.). The baseband circuitry 804 (e.g., one or more of baseband processors 804*a-d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although other types of baseband signals may be used. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although other types of devices may provide the frequency input. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop.

In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE device 800 may include additional elements such as, for example, memory/storage, display (e.g., touch screen), camera, antennas, keyboard, microphone, speakers, sensor, and/or input/output (I/O) interface.

Figure 9:
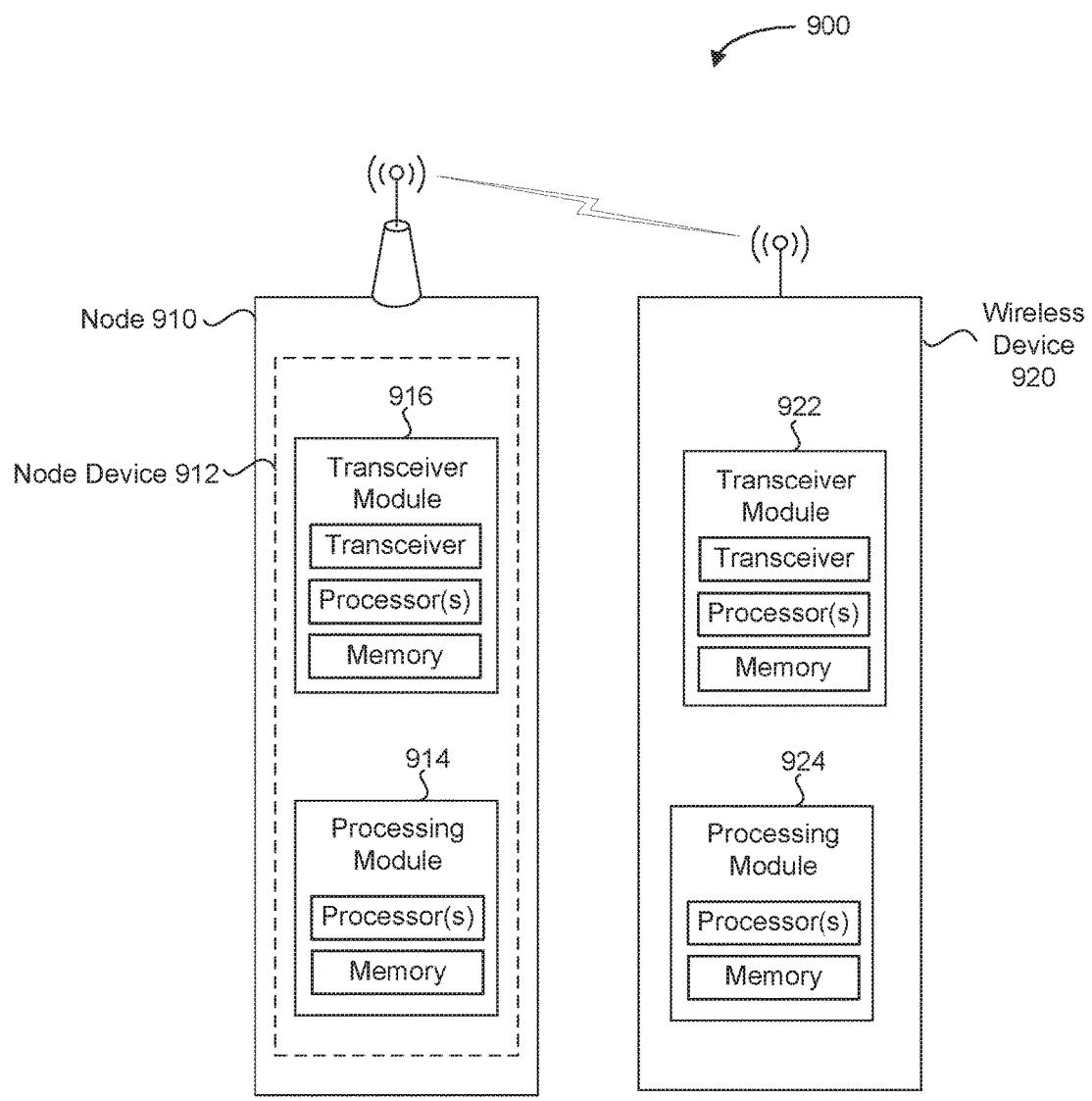
FIG. 9 illustrates a diagram of a node (e.g., eNB and/or a Serving GPRS Support Node) and a wireless device (e.g., UE) in accordance with an example.

FIG. 9 illustrates a diagram 900 of a node 910 (e.g., eNB and/or a Serving GPRS Support Node) and a wireless device 920 (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 910 can include a node device 912. The node device 912 or the node 910 can be configured to communicate with the wireless device 920. The node device 912 can be configured to implement technologies described herein. The node device 912 can include a processing module 914 and a transceiver module 916. In one aspect, the node device 912 can include the transceiver module 916 and the processing module 914 forming a circuitry for the node 910. In one aspect, the transceiver module 916 and the processing module 914 can form a circuitry of the node device 912. The processing module 914 can include one or more processors and memory. In one embodiment, the processing module 922 can include one or more application processors. The transceiver module 916 can include a transceiver and one or more processors and memory. In one embodiment, the transceiver module 916 can include a baseband processor.

The wireless device 920 can include a transceiver module 924 and a processing module 922. The processing module 922 can include one or more processors and memory. In one embodiment, the processing module 922 can include one or more application processors. The transceiver module 924 can include a transceiver and one or more processors and memory. In one embodiment, the transceiver module 924 can include a baseband processor. The wireless device 920 can be configured to implement technologies described herein. The node 910 and the wireless devices 920 can also include one or more storage mediums, such as the transceiver module 916, 924 and/or the processing module 914, 922.

EXAMPLES

The following examples pertain to specific embodiments and point out specific features, elements, or steps that can be used or otherwise combined in achieving such embodiments.

Figure 10:
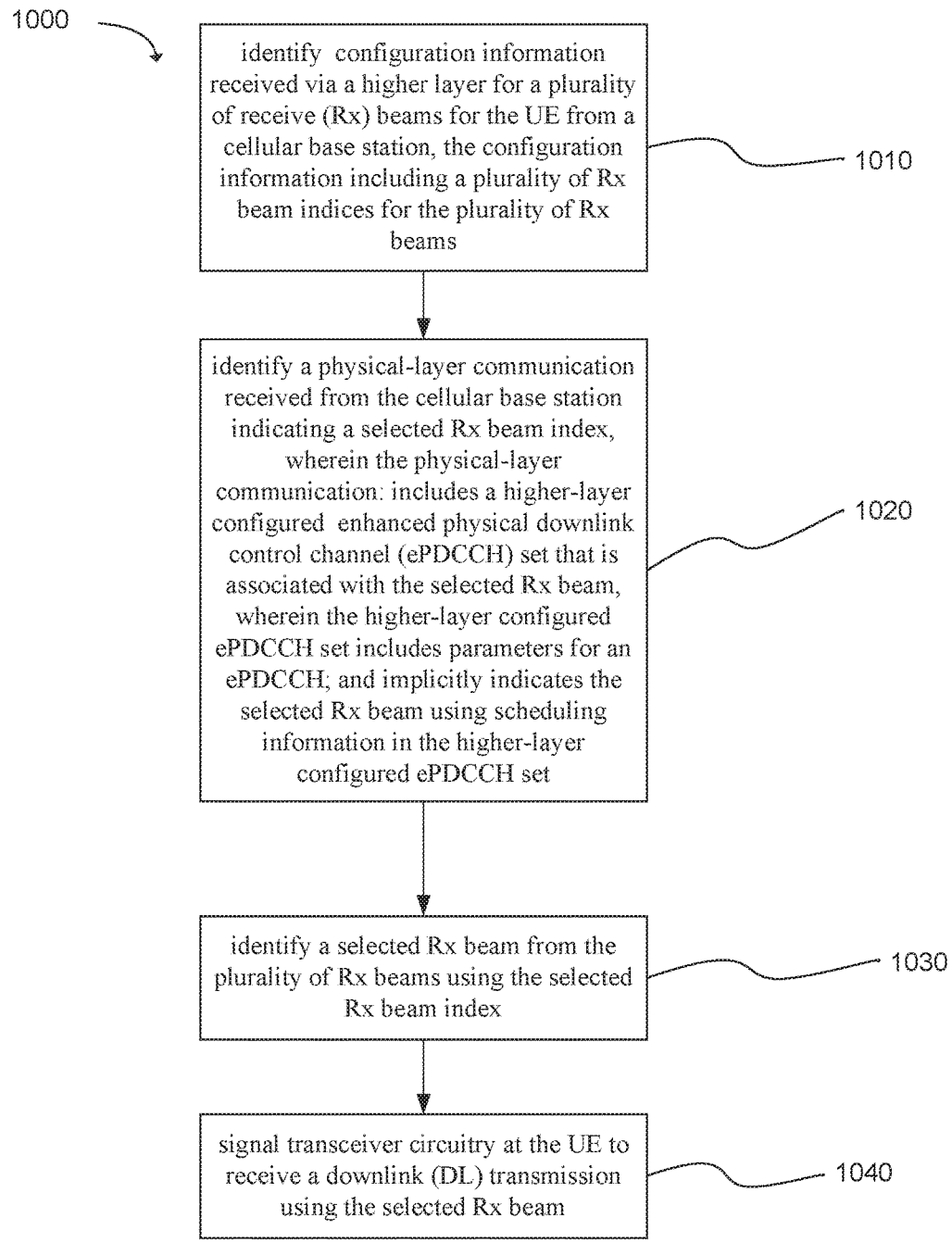
FIG. 10 illustrates functionality of a UE in accordance with an example.

FIG. 10 illustrates functionality 1000 of a UE in accordance with an example. The UE can comprise one or more processors and memory. The one or more processors and memory can be configured to: identify configuration information received via a higher layer for a plurality of receive (Rx) beams for the UE from a cellular base station, the configuration information including a plurality of Rx beam indices for the plurality of Rx beams, as in block 1010. In one alternative, the one or more processors and memory can be configured to: identify a physical-layer communication received from the cellular base station indicating a selected Rx beam index, wherein the physical-layer communication: includes a higher-layer configured enhanced physical downlink control channel (ePDCCH) set that is associated with the selected Rx beam, wherein the higher-layer configured ePDCCH set includes parameters for an ePDCCH; and implicitly indicates the selected Rx beam using scheduling information in the higher-layer configured ePDCCH set, as in block 1020. The one or more processors and memory can be configured to: identify a selected Rx beam from the plurality of Rx beams using the selected Rx beam index, as in block 1030. The one or more processors and memory can be configured to signal transceiver circuitry at the UE to receive a downlink (DL) transmission using the selected Rx beam, as in block 1040.

Figure 11:
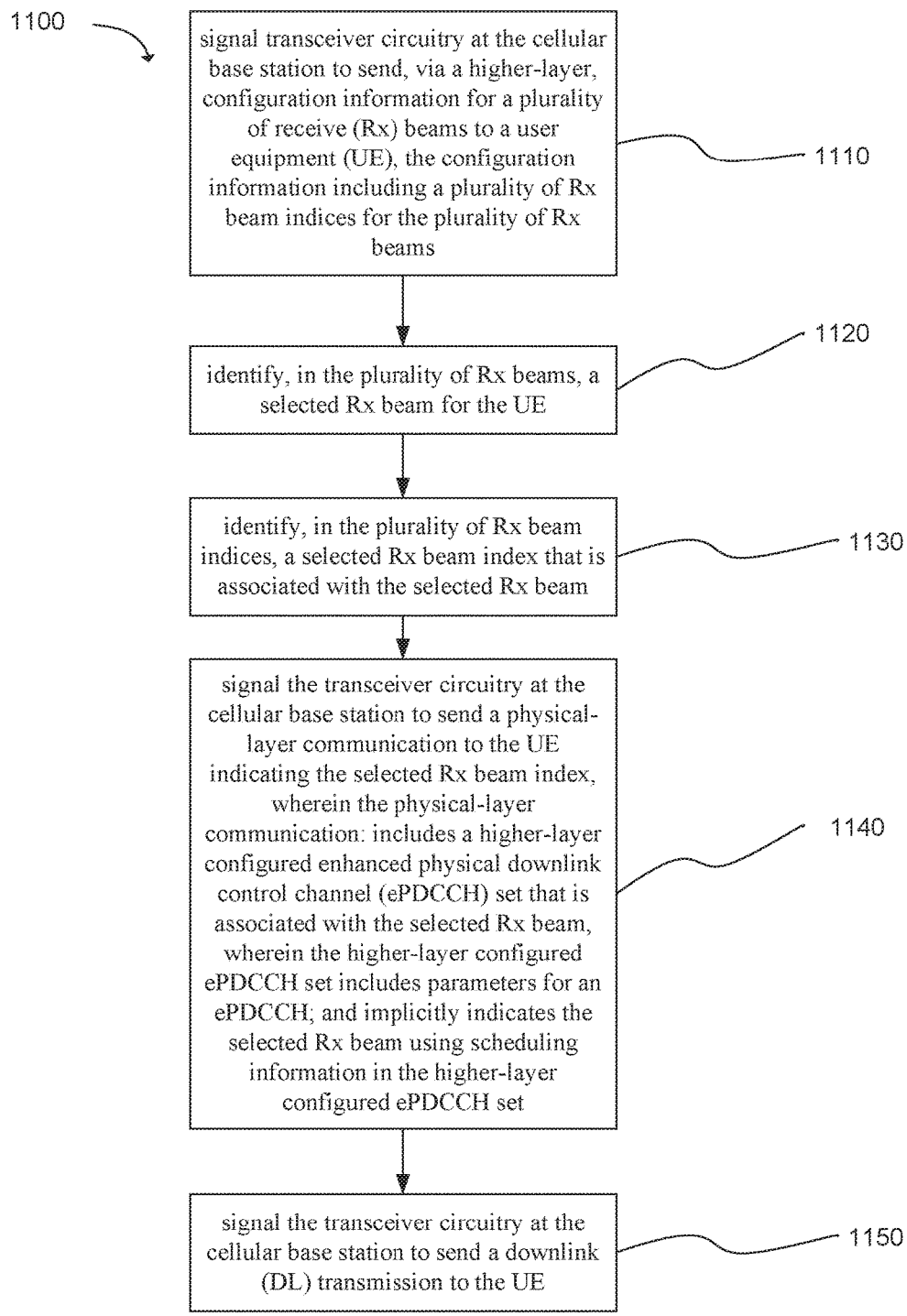
FIG. 11 illustrates functionality of a cellular base station in accordance with an example.

FIG. 11 illustrates functionality 1100 of a cellular base station in accordance with an example. The cellular base station can comprise one or more processors and memory. The one or more processors and memory can be configured to: signal transceiver circuitry at the cellular base station to send, via a higher-layer, configuration information for a plurality of receive (Rx) beams to a user equipment (UE), the configuration information including a plurality of Rx beam indices for the plurality of Rx beams, as in block 1110. The one or more processors and memory can be configured to: identify, in the plurality of Rx beams, a selected Rx beam for the UE, as in block 1120. The one or more processors and memory can be configured to: identify, in the plurality of Rx beam indices, a selected Rx beam index that is associated with the selected Rx beam, as in block 1130. In one alternative, the one or more processors and memory can be configured to: signal the transceiver circuitry at the cellular base station to send a physical-layer communication to the UE indicating the selected Rx beam index, wherein the physical-layer communication: includes a higher-layer configured enhanced physical downlink control channel (ePDCCH) set that is associated with the selected Rx beam, wherein the higher-layer configured ePDCCH set includes parameters for an ePDCCH, and implicitly indicates the selected Rx beam using scheduling information in the higher-layer configured ePDCCH set, as in block 1140. The one or more processors and memory can be configured to: signal the transceiver circuitry at the cellular base station to send a downlink (DL) transmission to the UE, as in block 1150.

Example 1 includes an apparatus of a user equipment (UE), the apparatus comprising one or more processors and memory configured to: identify configuration information received via a higher layer for a plurality of receive (Rx) beams for the UE from a cellular base station, the configuration information including a plurality of Rx beam indices for the plurality of Rx beams; identify a physical-layer communication received from the cellular base station indicating a selected Rx beam index; identify a selected Rx beam from the plurality of Rx beams using the selected Rx beam index; and signal transceiver circuitry at the UE to receive a downlink (DL) transmission at the UE using the selected Rx beam.

Example 2 includes the apparatus of example 1, wherein the one or more processors and memory are further configured to signal the transceiver circuitry at the UE to receive the DL transmission in a physical downlink shared channel (PDSCH).

Example 3 includes the apparatus of example 2, wherein the one or more processors and memory are further configured to tune analog Rx beamforming weights during a designated tuning time interval between orthogonal-frequency-division-multiplexing (OFDM) symbols of an enhanced physical downlink control channel (ePDCCH) and OFDM symbols of the PDSCH.

Example 4 includes the apparatus of example 1, 2, or 3, wherein the one or more processors and memory are further configured to perform channel state information (CSI) measurements using the selected Rx beam.

Example 5 includes the apparatus of example 1, 2, or 3, wherein the one or more processors and memory are further configured to signal the transceiver circuitry at the UE to receive the configuration information via radio-resource-control (RRC) signaling and wherein the selected Rx beam index is included in a configured parameter set.

Example 6 includes the apparatus of example 1, 2, or 3, wherein at least one Rx beam index in the plurality of Rx beam indices is associated with a substantially omni-directional Rx beam, and wherein the plurality of Rx beams includes the substantially omni-directional Rx beam.

Example 7 includes the apparatus of example 1, 2, or 3, wherein the physical-layer communication comprises a downlink control indicator (DCI) received in an enhanced physical downlink control channel (ePDCCH) and the selected Rx beam index is explicitly included in the DCI.

Example 8 includes the apparatus of example 7, wherein the one or more processors and memory are further configured to commence performing channel state information (CSI) measurement using the selected Rx beam based on the explicit inclusion of the selected Rx beam index in the DCI.

Example 9 includes the apparatus of example 1, 2, or 3, wherein the physical-layer communication: includes a higher-layer configured enhanced physical downlink control channel (ePDCCH) set that is associated with the selected Rx beam, wherein the higher-layer configured ePDCCH set includes parameters for an ePDCCH; and implicitly indicates the selected Rx beam using scheduling information in the higher-layer configured ePDCCH set.

Example 10 includes the apparatus of example 9, wherein the higher-layer configured ePDCCH set comprises a scrambling identity of demodulation reference signals and occupied physical resource blocks.

Example 11 includes the apparatus of example 9, wherein the one or more processors and memory are further configured to commence performing demodulation of a physical downlink shared channel (PDSCH) using the selected Rx beam, wherein the selected Rx beam is implicitly indicated to the UE in the higher-layer configured EPDCCH set, and wherein the higher-layer configured EPDCCH set includes PDSCH scheduling information.

Example 12 includes the apparatus of example 9, wherein the one or more processors and memory are further configured to commence performing measurement of the channel state information (CSI) using the selected Rx beam, wherein the selected Rx beam is implicitly indicated to the UE in the higher-layer configured ePDCCH set.

Example 13 includes the apparatus of example 1, 2, or 3, wherein the one or more processors and memory are further configured to signal the transceiver circuitry at the UE to receive a channel state information reference signal (CSI-RS) from the cellular base station using the selected Rx beam.

Example 14 includes an apparatus of a cellular base station supporting dynamic point selection (DPS) in a downlink coordinated multipoint (DL CoMP) scheme, the apparatus comprising one or processors and memory configured to: signal transceiver circuitry at the cellular base station to send, via a higher-layer, configuration information for a plurality of receive (Rx) beams to a user equipment (UE), the configuration information including a plurality of Rx beam indices for the plurality of Rx beams; identify, in the plurality of Rx beams, a selected Rx beam for the UE; identify, in the plurality of Rx beam indices, a selected Rx beam index that is associated with the selected Rx beam; signal the transceiver circuitry at the cellular base station to send a physical-layer communication to the UE indicating the selected Rx beam index; and signal the transceiver circuitry at the cellular base station to send a downlink (DL) transmission to the UE.

Example 15 includes the apparatus of example 14, wherein the one or more processors and memory are further configured to signal the transceiver circuitry at the cellular base station to send the DL transmission in a physical downlink shared channel (PDSCH).

Example 16 includes the apparatus of example 14 or 15, wherein the one or more processors and memory are further configured to signal the transceiver circuitry at the cellular base station to send the configuration information via radio-resource-control (RRC) signaling and wherein the selected Rx beam index is included in a configured parameter set.

Example 17 includes the apparatus of example 14 or 15, wherein at least one Rx beam index in the plurality of Rx beam indices is associated with a substantially omni-directional Rx beam, and wherein the plurality of Rx beams includes the substantially omni-directional Rx beam.

Example 18 includes the apparatus of example 14 or 15, wherein the physical-layer communication comprises a downlink control indicator (DCI) in an enhanced physical downlink control channel (ePDCCH) and the selected Rx beam index is explicitly included in the DCI.

Example 19 includes the apparatus of example 14 or 15, wherein the physical-layer communication: includes a higher-layer configured enhanced physical downlink control channel (ePDCCH) set that is associated with the selected Rx beam, wherein the higher-layer configured ePDCCH set includes parameters for an ePDCCH; and implicitly indicates the selected Rx beam using scheduling information in the higher-layer configured ePDCCH set.

Example 20 includes a non-transitory or transitory computer-readable storage medium having instructions thereon which, when executed by one or more processors of a user equipment (UE), perform the following: identifying configuration information received via a higher layer for a plurality of receive (Rx) beams for the UE from a cellular base station, the configuration information including a plurality of Rx beam indices for the plurality of Rx beams; identifying a physical-layer communication received from the cellular base station indicating a selected Rx beam index; identifying a selected Rx beam from the plurality of Rx beams using the selected Rx beam index; and signaling transceiver circuitry at the UE to receive a downlink (DL) transmission at the UE using the selected Rx beam.

Example 21 includes the computer-readable storage medium of example 20, further comprising instructions thereon which, when executed by the one or more processors of the UE, perform the following: signaling the transceiver circuitry at the UE to receive the DL transmission in a physical downlink shared channel (PDSCH).

Example 22 includes the computer-readable storage medium of example 21, further comprising instructions thereon which, when executed by the one or more processors of the UE, perform the following: tuning analog Rx beamforming weights during a designated tuning time interval between orthogonal-frequency-division-multiplexing (OFDM) symbols of an enhanced physical downlink control channel (ePDCCH) and OFDM symbols of the PDSCH.

Example 23 includes the computer-readable storage medium of example 20, 21, or 22, further comprising instructions thereon which, when executed by the one or more processors of the UE, perform the following: signaling the transceiver circuitry at the UE to receiving a channel state information reference signal (CSI-RS) from the cellular base station using the selected Rx beam; and performing channel state information (CSI) measurements using the selected Rx beam.

Example 24 includes the computer-readable storage medium of example 20, 21, or 22, wherein the configuration information is received via radio-resource-control (RRC) signaling, wherein the selected Rx beam index is included in a configured parameter set.

Example 25 includes the computer-readable storage medium of example 20, 21, or 22, wherein at least one Rx beam index in the plurality of Rx beam indices is associated with a substantially omni-directional Rx beam, and wherein the plurality of Rx beams includes the substantially omni-directional Rx beam.

Example 26 includes the computer-readable storage medium of example 20, 21, or 22, wherein the physical-layer communication comprises a downlink control indicator (DCI) received in an enhanced physical downlink control channel (ePDCCH) and the selected Rx beam index is explicitly included in the DCI.

Example 27 includes a means for receive-beam indication for a user equipment (UE), the means comprising: a means for receiving, via a higher-layer, configuration information for a plurality of receive (Rx) beams for the UE from a cellular base station, the configuration information including a plurality of Rx beam indices for the plurality of Rx beams; a means for receiving, from the cellular base station, a physical-layer communication indicating a selected Rx beam index; a means for identifying a selected Rx beam from the plurality of Rx beams using the selected Rx beam index; and a means for receiving a downlink (DL) transmission at the UE using the selected Rx beam.

Example 28 includes the means of example 27, further comprising: a means for receiving the DL transmission in a physical downlink shared channel (PDSCH).

Example 29 includes the means of example 28, further comprising: a means for tuning analog Rx beamforming weights during a designated tuning time interval between orthogonal-frequency-division-multiplexing (OFDM) symbols of an enhanced physical downlink control channel (ePDCCH) and OFDM symbols of the PDSCH.

Example 30 includes the means of example 27, further comprising: a means for receiving a channel state information reference signal (CSI-RS) from the cellular base station using the selected Rx beam; and a means for performing channel state information (CSI) measurements using the selected Rx beam.

Example 31 includes the means of example 27, further comprising: a means for receiving the configuration information via radio-resource-control (RRC) signaling, wherein the selected Rx beam index is included in a configured parameter set.

Example 32 includes the means of example 27, wherein at least one Rx beam index in the plurality of Rx beam indices is associated with a substantially omni-directional Rx beam, and wherein the plurality of Rx beams includes the substantially omni-directional Rx beam.

Example 33 includes the means of example 27, wherein the physical-layer communication comprises a downlink control indicator (DCI) received in an enhanced physical downlink control channel (ePDCCH) and the selected Rx beam index is explicitly included in the DCI.

Example 34 includes the UE of example 1, 2, or 3, wherein the physical-layer communication comprises a downlink control indicator (DCI) received in an enhanced physical downlink control channel (ePDCCH) and the selected Rx beam index is explicitly included in the DCI, and wherein the one or more processors and memory are further configured to commence performing channel state information (CSI) measurement using the selected Rx beam based on the explicit inclusion of the selected Rx beam index in the DCI.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flew chart may be omitted or skipped. Any number of counters, state variables, warning semaphores, or messages may be added to the logical flow for enhanced utility, accounting, performance, measurement, troubleshooting, or other purposes.

As used herein, the word "or" indicates an inclusive disjunction. For example, as used herein, the phrase "A or B" represents an inclusive disjunction of exemplary conditions A and B. Hence, "A or B" is false only if both condition A is false and condition B is false. When condition A is true and condition B is also true, "A or B" is also true. When condition A is true and condition B is false, "A or B" is true. When condition B is true and condition A is false, "A or B" is true. In other words, the term "or," as used herein, should not be construed as an exclusive disjunction. The term "xor" is used where an exclusive disjunction is intended.

As used herein, the term processor can include general-purpose processors, specialized processors such as VLSI, FPGAs, and other types of specialized processors, as well as base-band processors used in transceivers to send, receive, and process wireless communications.

It should be understood that many of the functional units described in this specification have been labeled as modules, in order to more particularly emphasize their implementation independence. For example, a module can be implemented as a hardware circuit (e.g., an application-specific integrated circuit (ASIC)) comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module do not have to be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be . . . identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

As used herein, the term "processor" can include general purpose processors, specialized processors such as VLSI, FPGAs, and other types of specialized processors, as well as base band processors used in transceivers to send, receive, and process wireless communications.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples can be referred to herein along with alternatives for the various components thereof. It is understood that such embodiments, examples, and alternatives are not to be construed as de facto equivalents of one another, but are to be considered as separate and autonomous.

Furthermore, the described features, structures, or characteristics can be combined in any suitable manner in one or more embodiments. In the foregoing description, numerous specific details are provided, such as examples of layouts, distances, network examples, etc., to provide a thorough understanding of some embodiments. One skilled in the relevant art will recognize, however, that the some embodiments can be practiced without one or more of the specific details, or with other methods, components, layouts, etc. In other instances, well-known structures, materials, or operations are not shown or described in detail to avoid obscuring aspects of different embodiments.

While the forgoing examples are illustrative of the principles used in various embodiments in one or more particular applications, it will be apparent to those of ordinary skill in the art that numerous modifications in form, usage and details of implementation can be made without the exercise of inventive faculty, and without departing from the principles and concepts of the embodiments. Accordingly, it is not intended that the claimed matter be limited, except as by the claims set forth below.

What is claimed is:

1. An apparatus of a user equipment (UE), the apparatus comprising one or more processors and memory configured to:
identify configuration information received via a higher layer for a plurality of receive (Rx) beams for the UE from a cellular base station, the configuration information including a plurality of Rx beam indices for the plurality of Rx beams;
identify a physical-layer communication received from the cellular base station indicating a selected Rx beam index, wherein the physical-layer communication comprises a downlink control indicator (DCI) received in an enhanced physical downlink control channel (ePDCCH) and the selected Rx beam index is explicitly included in the DCI;
identify a selected Rx beam from the plurality of Rx beams using the selected Rx beam index; and
signal transceiver circuitry at the UE to receive a downlink (DL) transmission using the selected Rx beam.

2. The apparatus of claim 1, wherein the one or more processors and memory are further configured to signal the transceiver circuitry at the UE to receive the DL transmission in a physical downlink shared channel (PDSCH).

3. The apparatus of claim 2, wherein the one or more processors and memory are further configured to tune analog Rx beamforming weights during a designated tuning time interval between orthogonal-frequency-division-multiplexing (OFDM) symbols of an enhanced physical downlink control channel (ePDCCH) and OFDM symbols of the PDSCH.

4. The apparatus of claim 1, wherein the one or more processors and memory are further configured to perform channel state information (CSI) measurements using the selected Rx beam.

5. The apparatus of claim 1, wherein the configuration information is received via radio-resource-control (RRC) signaling and wherein the selected Rx beam index is included in a configured parameter set.

6. The apparatus of claim 1, wherein at least one Rx beam index in the plurality of Rx beam indices is associated with a substantially omni-directional Rx beam, and wherein the plurality of Rx beams includes the substantially omni-directional Rx beam.

7. The apparatus of claim 1, wherein the one or more processors and memory are further configured to commence performing channel state information (CSI) measurement using the selected Rx beam based on the explicit inclusion of the selected Rx beam index in the DCI.

8. The apparatus of claim 1, wherein the one or more processors and memory are further configured to signal the transceiver circuitry of the UE to receive a channel state information reference signal (CSI-RS) from the cellular base station using the selected Rx beam.

9. An apparatus of a cellular base station supporting dynamic point selection (DPS) in a downlink coordinated multipoint (DL CoMP) scheme, the apparatus comprising one or processors and memory configured to:
signal transceiver circuitry at the cellular base station to send, via a higher-layer, configuration information for a plurality of receive (Rx) beams to a user equipment (UE), the configuration information including a plurality of Rx beam indices for the plurality of Rx beams;
identify, in the plurality of Rx beams, a selected Rx beam for the UE;
identify, in the plurality of Rx beam indices, a selected Rx beam index that is associated with the selected Rx beam;
signal the transceiver circuitry at the cellular base station to send a physical-layer communication to the UE indicating the selected Rx beam index, wherein the physical-layer communication comprises a downlink control indicator (DCI) in an enhanced physical downlink control channel (ePDCCH) and the selected Rx beam index is explicitly included in the DCI; and
signal the transceiver circuitry at the cellular base station to send a downlink (DL) transmission to the UE.

10. The apparatus of claim 9, wherein the one or more processors and memory are further configured to signal the transceiver circuitry at the cellular base station to send the DL transmission in a physical downlink shared channel (PDSCH).

11. The apparatus of claim 9, wherein the one or more processors and memory are further configured to signal the transceiver circuitry at the cellular base station to send the configuration information via radio-resource-control (RRC) signaling and wherein the selected Rx beam index is included in a configured parameter set.

12. The apparatus of claim 9, wherein at least one Rx beam index in the plurality of Rx beam indices is associated with a substantially omni-directional Rx beam, and wherein the plurality of Rx beams includes the substantially omni-directional Rx beam.

13. A non-transitory computer-readable storage medium having instructions thereon which, when executed by one or more processors of a user equipment (UE), perform the following:
signaling transceiver circuitry at the UE to receive, via a higher-layer, configuration information for a plurality of receive (Rx) beams for the UE from a cellular base station, the configuration information including a plurality of Rx beam indices for the plurality of Rx beams;
identifying a physical-layer communication received from the cellular base station indicating a selected Rx beam index, wherein the physical-layer communication comprises a downlink control indicator (DCI) received in an enhanced physical downlink control channel (ePDCCH) and the selected Rx beam index is explicitly included in the DCI;
identifying a selected Rx beam from the plurality of Rx beams using the selected Rx beam index; and
signaling the transceiver circuitry at the UE to receive a downlink (DL) transmission at the UE using the selected Rx beam.

14. The non-transitory computer-readable storage medium of claim 13, further comprising instructions thereon which, when executed by the one or more processors of the UE, perform the following:
signaling the transceiver circuitry at the UE to receive the DL transmission in a physical downlink shared channel (PDSCH).

15. The non-transitory computer-readable storage medium of claim 14, further comprising instructions thereon which, when executed by the one or more processors of the UE, perform the following:
   tuning analog Rx beamforming weights during a designated tuning time interval between orthogonal-frequency-division-multiplexing (OFDM) symbols of an enhanced physical downlink control channel (ePDCCH) and OFDM symbols of the PDSCH.

16. The non-transitory computer-readable storage medium of claim 13, further comprising instructions thereon which, when executed by the one or more processors of the UE, perform the following:
   signaling the transceiver circuitry at the UE to receive a channel state information reference signal (CSI-RS) from the cellular base station using the selected Rx beam; and
   performing channel state information (CSI) measurements using the selected Rx beam.

17. The non-transitory computer-readable storage medium of claim 13, further comprising instructions thereon which, when executed by the one or more processors of the UE, perform the following:
   signaling the transceiver circuitry at the UE to receive the configuration information via radio-resource-control (RRC) signaling, wherein the selected Rx beam index is included in a configured parameter set.

18. The non-transitory computer-readable storage medium of claim 13, wherein at least one Rx beam index in the plurality of Rx beam indices is associated with a substantially omni-directional Rx beam, and wherein the plurality of Rx beams includes the substantially omni-directional Rx beam.

* * * * *